June 9, 1936.  P. A. JERGUSON  2,043,753
WATER LEVEL GAUGE
Filed Dec. 6, 1935
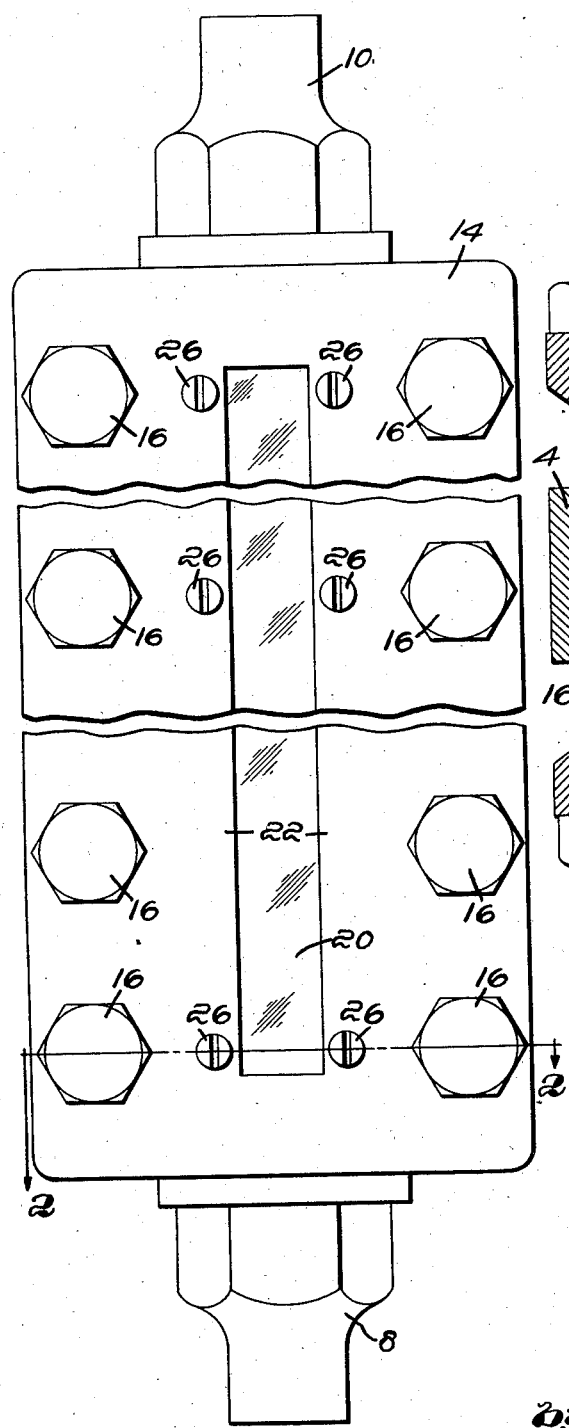
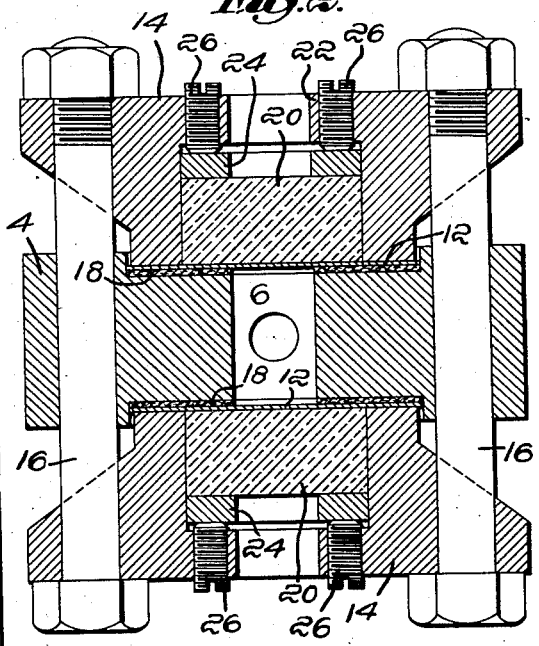
Inventor:
Philip A. Jerguson,
Attys Patented June 9, 1936

2,043,753

UNITED STATES PATENT OFFICE 2,043,753

WATER LEVEL GAUGE

Philip A. Jerguson, West Medford, Mass.

Application December 6, 1935, Serial No. 53,201

3 Claims. (Cl. 73—54)

This invention relates to water lever gauges such as are used on steam boilers and the object is to provide a gauge for high pressure work on a construction which will minimize the breakage of glasses while permitting the ready use of commercial glasses of varying thickness.

My invention will be well understood by reference to the following description of an illustrative embodiment thereof shown by way of example in the accompanying drawing, wherein:—

Fig. 1 is a broken front elevation of a gauge illustrative of my invention; and

Fig. 2 is a section on the line 2—2 of Fig. 1.

Referring to the drawing, the gauge there shown comprises a body 4 (Fig. 2) cut away between its ends to provide the open-sided chamber 6 adapted to be connected at 8 and 10 to the water and steam containing spaces of the boiler. Herein the chamber is open on both sides to permit inspection of the water column from either side, the enclosure being completed by suitable coverings having sight openings closed by transparent material. Herein each side of the chamber is closed by a transparent membrane 12 of mica, the margins of which overlie the body around the chamber and may be clamped thereagainst by the side members 14 secured together and pressed toward the body 4 by the bolts 16. I have herein shown suitable packing 18 interposed between the mica 12 and the underlying surface of the body member 4. The members 14 are provided with suitable sight openings receiving the glasses 20. In the embodiment of the invention shown the mica 12 resists the action of the steam and at the sight opening is backed up and supported by the glass 20 which, however, is not clamped but is positioned loosely to overlie the membrane to provide for freedom of expansion of the glass relatively to the adjacent metal parts, thus to minimize breakage.

Herein the sight opening is formed with an exterior overhanging flange 22 around its periphery defining beneath the same a chamber of a depth substantially greater than the maximum thickness of the glasses encountered commercially. A frame 24 may be disposed rearwardly of the flange 22 and is adapted to overlie the margins of the glass. Screws 26 may be tapped into the flange 22 to engage the frame 24 which thus may be adjusted in and out. Therefore whatever the thickness of the glass 20, it may be positioned nicely to bring its inner surface in the proper position relative to the membrane 12 to support the latter against pressure on the one hand yet permit such relative movement as to provide for independent expansion and contraction of the glass which will minimize breakage thereof. It is not necessary to provide a glass of accurate thickness but, on the contrary, glasses of markedly different thicknesses such as are in practice procured from different makers can be used interchangeably.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A gauge comprising a body having an open-sided chamber to receive a water column, a transparent membrane overlying the open side, a member secured to the body and clamping thereto the margins of the membrane, said member having an opening aligned with at least a part of the chamber, a glass received in said opening loosely to overlie the membrane, and means associated with said member and adjustable in and out to and from the plane of the membrane for supporting the outer face of the glass.

2. A gauge comprising a body having an open-sided chamber to receive a water column, a transparent membrane overlying the open side, a member secured to the body and clamping thereto the margins of the membrane, said member having an opening aligned with at least a part of the chamber, a glass received in said opening loosely to overlie the membrane, a frame movable in said opening and overlying the margin of the front face of the glass, and means for adjustably positioning the frame to accommodate glasses of different thicknesses with their inner faces in the same relation to the membrane.

3. A gauge comprising a body having an open-sided chamber to receive a water column, a transparent membrane overlying the open side, a member secured to the body and clamping thereto the margins of the membrane, said member having an opening aligned with at least a part of the chamber and having exteriorly an overhanging flange, a glass received in the opening with its margins beneath the flange, and screw means cooperating with the flange for adjustably positioning the outer face of the glass relative thereto.

PHILIP A. JERGUSON.